(12) United States Patent
Oyama

(10) Patent No.: US 9,538,131 B2
(45) Date of Patent: Jan. 3, 2017

(54) REMOTE BEHAVIOR NAVIGATION SYSTEM AND PROCESSING METHOD THEREOF

(71) Applicant: National Institute of Advanced Industrial Science and Technology, Tokyo (JP)

(72) Inventor: Eimei Oyama, Tsukuba (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 0 days.

(21) Appl. No.: 15/031,672

(22) PCT Filed: Oct. 23, 2014

(86) PCT No.: PCT/JP2014/078236
§ 371 (c)(1),
(2) Date: Apr. 22, 2016

(87) PCT Pub. No.: WO2015/060393
PCT Pub. Date: Apr. 30, 2015

(65) Prior Publication Data
US 2016/0277710 A1    Sep. 22, 2016

(30) Foreign Application Priority Data
Oct. 25, 2013    (JP) .................................. 2013-222493

(51) Int. Cl.
*H04N 7/14*    (2006.01)
*H04N 7/15*    (2006.01)
(Continued)

(52) U.S. Cl.
CPC .......... *H04N 7/147* (2013.01); *G02B 27/0172* (2013.01); *G06F 3/048* (2013.01);
(Continued)

(58) Field of Classification Search
CPC ....................................................... H04N 7/14
(Continued)

(56) References Cited

U.S. PATENT DOCUMENTS

| 2009/0080699 A1 | 3/2009 | Ng-Thow-Hing et al. |
| 2015/0244977 A1* | 8/2015 | Sherburne .............. H04N 7/142 348/14.02 |

(Continued)

FOREIGN PATENT DOCUMENTS

| JP | H8-257948 A | 10/1996 |
| JP | H11-298872 A | 10/1999 |

(Continued)

OTHER PUBLICATIONS

Eimei Oyama, *Behavior Navigation System for Use in Harsh Environments*, Proceedings of the 2011 IEEE International Symposium on Safety, Security and Rescue Robotics, Nov. 1-5, 2011, 25 pages.

(Continued)

*Primary Examiner* — Olisa Anwah
(74) *Attorney, Agent, or Firm* — Workman Nydegger

(57) ABSTRACT

There are provided a remote behavior navigation system and a method thereof, which allow an instructor at a remote location to perform guidance to a worker while watching a work video picture of the worker. Corresponding to a video picture from a worker-side camera at time t1, an instructor-side computer extracts a work instruction video picture from a video picture of an instructor-side camera at time t2. The instructor-side computer superimposes the work instruction video picture at the time t2 on the video picture from the worker-side camera at the time t1, and displays the superimposed video picture on an instructor-side monitor. A worker-side computer provides the work instruction video picture at the time t2 with a time difference correction, then (Continued)

superimposes the corrected work instruction video picture on a video picture from the worker-side camera at time t3, and displays the superimposed video picture on a worker-side monitor.

8 Claims, 6 Drawing Sheets

(51) Int. Cl.
    *G06T 19/00* (2011.01)
    *G06F 3/048* (2013.01)
    *G02B 27/01* (2006.01)
(52) U.S. Cl.
    CPC .............. *G06T 19/006* (2013.01); *H04N 7/15* (2013.01); *G02B 2027/014* (2013.01); *G02B 2027/0138* (2013.01)
(58) Field of Classification Search
    USPC ................................. 348/14.01, 14.03, 14.07
    See application file for complete search history.

(56) References Cited

U.S. PATENT DOCUMENTS

| | | | | |
|---|---|---|---|---|
| 2015/0339453 | A1* | 11/2015 | Richards | G06T 11/00 |
| | | | | 345/633 |
| 2015/0365635 | A1* | 12/2015 | Jose | H04N 7/185 |
| | | | | 348/14.07 |
| 2016/0253563 | A1* | 9/2016 | Lam | G06K 9/00671 |

FOREIGN PATENT DOCUMENTS

| | | |
|---|---|---|
| JP | 2003-037840 A | 2/2003 |
| JP | 2003-209832 A | 7/2003 |
| JP | 2006-279648 A | 10/2006 |
| JP | 2008-124795 A | 5/2008 |
| JP | 2010-541065 A | 12/2010 |

OTHER PUBLICATIONS

International Preliminary Report on Patentability dated May 6, 2016, issued in PCT Application No. PCT/JP2014/078236, filed Oct. 23, 2014.

* cited by examiner

REMOTE BEHAVIOR NAVIGATION SYSTEM AND PROCESSING METHOD THEREOF

TECHNICAL FIELD

The present invention relates to a remote behavior navigation system and a processing method thereof, which allow an instructor at a remote location to provide a work instruction to a worker while watching a work video picture of the worker, or more specifically, to a remote behavior navigation system and a processing method thereof, which provide guidance to the worker by using augmented reality technology.

BACKGROUND ART

There has been known a remote action guidance system configured to send a work video picture and a voice of a worker, who performs prescribed work at a work site, to an instructor at a remote location through a bidirectional communication network (line), and to allow the instructor having expertise in that work to provide a work instruction to the worker while watching the work video picture.

For example, PTL 1 discloses a remote action guidance system which is configured to cause a worker to superimpose an index for instructing a region, on which the worker is supposed to work, on a target region of an actual optical image of a work target through a monitor screen by using a head mount display (HMD), thereby enabling an instructor to transmit an instruction easily and accurately. Here, the HMD is an apparatus which is put on the head or the face of a wearer, and is configured to project a video picture on an organic EL display, a liquid crystal display device, and the like directly onto the eyeballs of the wearer by use of an eyepiece optical system, and enables the wearer to observe a virtual video picture as if the video picture is projected into the air. Specifically, according to the remote action guidance system, the worker puts on the HMD equipped with a camera unit, and transmits a video picture of a work target shot with the camera unit to the instructor at a remote location. While observing this video picture through a monitor of a remote instruction device, the instructor provides the worker with video and audio information from the remote instruction device through the HMD, thereby providing a work instruction. The literature states that, the worker is able to reach out the hands to an instructed region while easily recognizing the region by using an index provided onto the virtual video picture on the HMD, and thus to improve workability.

Meanwhile, NPL 1 discloses a remote action guidance system as a PH (parasitic humanoid) system, which allows an expert worker to support work by an inexpert worker, for example. Each of the inexpert worker on site and the expert worker at a remote location puts on a microphone and a wearable camera which is an HMD equipped with a camera unit. The expert worker who receives information from the site performs work in a virtual space through a monitor. From a video picture shot with the camera that is put on the expert worker, a video picture of the hands or arms of the expert worker is extracted or a CG image of the hands or arms is created, and the video picture or the image is displayed in such a way as to be superimposed on a video picture shot with the camera that is put on the on-site worker. In this way, work guidance to the on-site worker is performed by using augmented reality (AR) technology.

Note that PTL 2, for example, describes a master-slave robot configured such that a robot is operated in conformity with an action of an operator at a remote location. This robot is also similar to the above-described remote action guidance system.

However, the on-site worker (the worker) receives action information from the instructor (the expert worker) and determines his or her own action on site based on the action information in the case of the above-described remote action guidance system, whereas the action is determined corresponding to action information of the operator in the case of the master-slave robot. In other words, timings for determining the action of the on-site worker (the robot) are different.

CITATION LIST

Patent Literature

PTL 1: Japanese Patent Laid-Open No. 2008-124795
PTL 2: Japanese Patent Laid-Open No. H08-257948(1996)

Non Patent Literature

NPL 1: "Innovative Integrated Sensing Technologies/Multisensory Information Communication and Environmental Sensing • Action Guidance by Parasitic Humanoid Network", Performance Reporting 2013, Strategic Basic Research Programs, Japan Science and Technology Agency

SUMMARY OF INVENTION

Technical Problem

Meanwhile, in the remote action guidance system, if the work video picture of the worker is sent to the instructor at the remote location and the index, the work video picture of the instructor, and the like as mentioned above are superimposed on this work video picture and are sent to the worker again, it takes quite a long time depending on an amount of data or a condition of the communication network (line). In other words, the work video picture thus returned may represent a situation substantially different from a current situation around the worker due to a time delay. In this case, the returned work video picture may rather hinder workability of the worker.

The present invention has been made in view of the above-described circumstances. An object of the present invention is to provide a remote behavior navigation system and a processing method thereof, which are capable of suppressing hindrance to workability due to a time delay when an instructor at a remote location provides guidance to a worker by the augmented reality (AR) technology while watching a work video picture of the worker.

Solution to Problem

The present invention provides a remote behavior navigation system configured to allow an instructor at a remote location to provide a work instruction to a worker while watching a work video picture of the worker, characterized in that the system includes: a first camera and a first monitor provided to the worker; a worker-side computer configured to control the first camera and the first monitor; a second camera and a second monitor provided to the instructor; and an instructor-side computer configured to control the second camera and the second monitor, the instructor-side computer being connected to the worker-side computer via a bidirectional communication network. The instructor-side computer extracts a work instruction video picture from a video picture of the second camera at time t2 corresponding to a video picture from the first camera at time t1, (1) the instructor-side computer superimposes the work instruction video picture at the time t2 on the video picture from the first camera at the time t1, and displays the superimposed video picture on the second monitor, and (2) the worker-side computer provides the work instruction video picture at the time t2 with a time difference correction being a function of $\tau=|t3-t1|$, then superimposes the corrected work instruction video picture on a video picture from the first camera at time t3, and displays the superimposed video picture on the first monitor.

According to the above-described invention, since the work instruction video picture is extracted and transmitted to the worker, it is possible to reduce a volume of data transmission and to reduce a time delay in the data transmission as compared to the case of superimposing an instruction video picture on a work video picture and then transmitting the superimposed video picture. Moreover, by using a time difference correction which is the function of $\tau=|t3-t1|$, it is possible to form the video picture to be visually checked by the worker during the work into the video picture that almost corresponds to that point (time t=t3). In other words, it is possible to suppress hindrance to workability due to the time delay, so that the worker can perform accurate work while efficiently receiving the instruction by the instructor. Furthermore, the worker can deal with an on-site situation at the time t3 by using an on-site video picture at the time t3.

The above-described remote behavior navigation system may be characterized in that the time difference correction is homographic transformation based on a comparison between the video pictures from the first camera at the time t1 and the time t3. According to the above-described invention, it is possible to perform the time difference correction more accurately. In other words, it is possible to suppress hindrance to workability due to the time delay, so that the worker can perform accurate work while receiving the instruction by the instructor even more efficiently.

The above-described remote behavior navigation system may be characterized in that the first camera is a monocular device to cover one of the eyes of the worker, and the second camera is a binocular device to cover both of the eyes of the instructor. According to the above-described invention, since it is possible to reduce the time delay, the worker can perform the work while receiving the instruction by the instructor using one of the eyes and visually checking an actual situation using the other eye. In other words, the worker can perform the accurate work while efficiently receiving the instruction by the instructor, and promptly deal with a sudden change in the situation, if any.

The above-described remote behavior navigation system may be characterized in that each of the first camera and the second camera is the binocular device to cover both of the eyes of the worker or the instructor. According to the above-described invention, it is possible to form the video picture to be visually checked by the worker during the work into the video picture that almost corresponds to that point (the time t=t3), and to reduce the time delay. Thus, the worker can perform the work and improve feeling of presence only with the binocular device.

The present invention provides a processing method of remote behavior navigation allowing the instructor at the remote location to provide the work instruction to the worker while watching the work video picture of the worker.

The method is applicable to a system including the first camera and the first monitor provided to the worker, the worker-side computer configured to control the first camera and the first monitor, the second camera and the second monitor provided to the instructor, and the instructor-side computer configured to control the second camera and the second monitor, the instructor-side computer being connected to the worker-side computer via the bidirectional communication network. The processing method is characterized in that the method includes: causing the instructor-side computer to extract the work instruction video picture from the video picture of the second camera at time t2 corresponding to the video picture from the first camera at time t1; (1) causing the instructor-side computer to superimpose the work instruction video picture at the time t2 on the video picture from the first camera at the time t1, and to display the superimposed video picture on the second monitor; and (2) causing the worker-side computer to provide the work instruction video picture at the time t2 with the time difference correction being the function of $\tau=|t3-t1|$, then to superimpose the corrected work instruction video picture on the video picture from the first camera at time t3, and to display the superimposed video picture on the first monitor.

According to the above-described processing method, since the work instruction video picture is extracted and transmitted to the worker, it is possible to reduce the volume of data transmission and to reduce the time delay in the data transmission as compared to the case of superimposing the instruction video picture on the work video picture and then transmitting the superimposed video picture. Moreover, by using the time difference correction which is the function of $\tau=|t3-t1|$, it is possible to form the video picture to be visually checked by the worker during the work into the video picture that almost corresponds to that point (the time t=t3). In other words, it is possible to suppress hindrance to workability due to the time delay, so that the worker can perform accurate work while efficiently receiving the instruction by the instructor.

The above-described processing method of remote behavior navigation may be characterized in that the time difference correction is homographic transformation based on a comparison between the video pictures from the first camera at the time t1 and the time t3. According to the above-described invention, it is possible to perform the time difference correction more accurately. In other words, it is possible to suppress hindrance to workability due to the time delay, so that the worker can perform accurate work while receiving the instruction by the instructor even more efficiently.

The above-described processing method of remote behavior navigation may be characterized in that the first camera is a monocular device to cover one of the eyes of the worker, and the second camera is a binocular device to cover both of the eyes of the instructor. According to the above-described invention, since it is possible to reduce the time delay, the worker can perform the work while receiving the instruction by the instructor using one of the eyes and visually checking an actual situation using the other eye. In other words, the worker can perform the accurate work while efficiently receiving the instruction by the instructor, and promptly deal with the sudden change in the situation, if any.

The above-described processing method of remote behavior navigation may be characterized in that each of the first camera and the second camera is the binocular device to cover both of the eyes of the worker or the instructor. According to the above-described invention, it is possible to form the video picture to be visually checked by the worker during the work into the video picture that almost corresponds to that point (the time t=t3), and to reduce the time delay. Thus, the worker can perform the work and improve the feeling of presence only with the binocular device.

DESCRIPTION OF EMBODIMENTS

An embodiment of a remote behavior navigation system and a processing method thereof according to the present invention will be described below by using FIG. 1 and FIG. 2.

Figure 1:
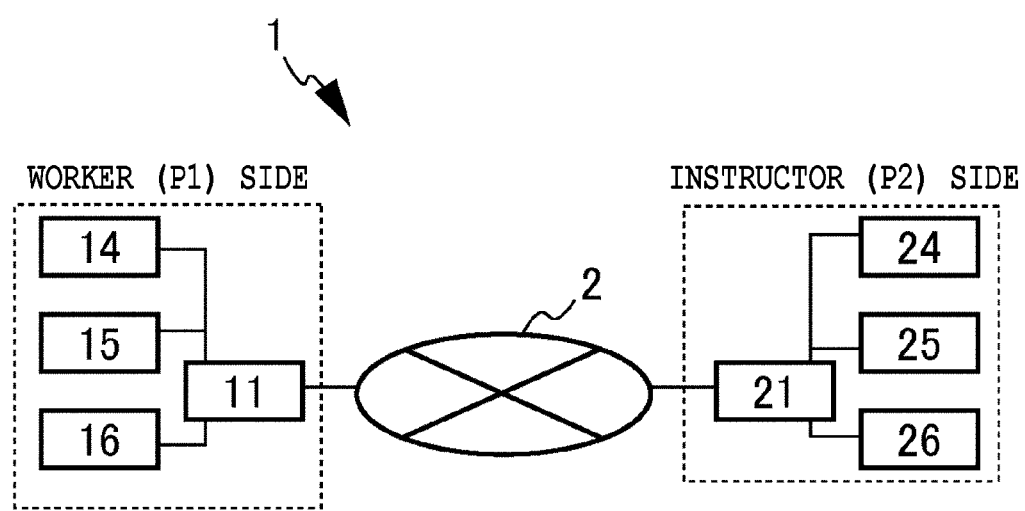
FIG. 1 is a block diagram showing a system according to the present invention.

As shown in FIG. 1, in a remote behavior navigation system 1, computers (PCs) 11 and 21 at least capable of processing video pictures are installed on a worker P1 side and on an instructor P2 side, respectively. A bidirectional communication line 2 connects between the PCs 11 and 21 in such a way as to be capable of transmitting and receiving data. The communication line 2 may partially include a wireless LAN, a dedicated line, and the like. A camera 14, a monitor 15, and a voice device (a microphone and a speaker) 16 are connected to the PC 11 on the worker side. Likewise, a camera 24, a monitor 25, and a voice device (a microphone and a speaker) 26 are connected to the PC 21 on the instructor side. As will be described later, in the light of workability it is preferable to incorporate these constituents as wearable apparatuses.

Figure 2:
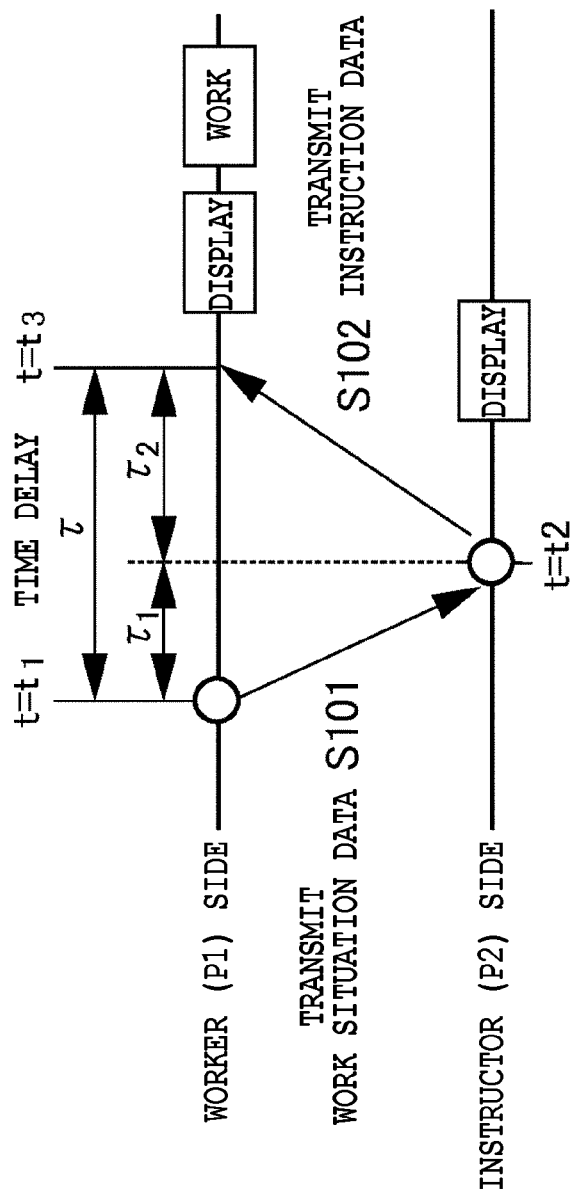
FIG. 2 is a diagram showing a transmission time delay.

Here, referring also to FIG. 2, in the remote behavior navigation system 1, work situation data at least containing a work video picture (an image) shot with the camera 14 on the worker side is transmitted from the PC 11 to the instructor-side PC 21 via the line 2 (S101). On the instructor-side PC 21, such a work video picture is displayed on the monitor 25. The instructor P2 thus enabled to grasp the work situation inputs contents to be worked on, on the basis of his or her experiences and the like and, in the form of an instruction video picture (an image) through the camera 24 or a voice through the voice device 26 as appropriate. This instruction data is transmitted from the instructor-side PC 21 to the worker-side PC 11 via the line 2 (S102). The worker-side PC 11 reproduces the instruction data in the form of the instruction video picture on the monitor 15 or voice data by using the voice device 16. Thus, the worker P1 can perform work in accordance with the instruction by the instructor P2.

In particular, it is preferable to present the instruction video picture of the contents to be worked on from the instructor P2 to the worker P1, in such a way as to superimpose the instruction video picture on the work video picture showing a work environment which is shot with the camera 14. Thus, it is possible to cause the worker P1 to visually grasp the contents to be worked on while feeling presence.

Meanwhile, the worker P1 has to stand by for a period of data transmission on the line 2 from time t=t1 of transmission of the work situation to time t=t3 of reception of the instruction from the instructor P2. If such a time delay $\tau=|t3-t1|$ is large relative to a change in the work situation of the worker P1, the work situation subject to the instruction may have changed and it would no longer be possible to actually accomplish the action guidance by the instructor P2.

Accordingly, an attempt to transmit the instruction video picture superimposed on the work video picture in the course of the aforementioned transmission (S102) of the instruction video picture from the instructor-side PC 21 to the worker-side PC 11 involves a large data volume and requires more time for data transfer. In other words, the time delay $\tau$ is increased. Given the circumstances, this embodiment takes into consideration transmission of only the instruction video picture at time t=t2, thus causing the worker-side PC 11 to superimpose the instruction video picture on the work video picture. In this case, assuming that line communication speeds are the same, time $\tau 2=|t3-t2|$ required for the transmission of the instruction data to the worker-side PC 11 (S102) can be made smaller than time $\tau 1=|t2-t1|$ required for the transmission of the work situation data to the instructor-side PC 21 (S101), and the time delay $\tau$ is not increased very much.

When the time delay $\tau$ is small, the worker P1 can perform the work while putting on a monocular HMD (head display) provided with the monitor 15. In other words, the worker can visually check the actual work situation with one eye and the contents of the instructed work displayed on the HMD with the other eye. According to this configuration, even in case of a sudden change in the work situation, it is possible to deal with the change promptly since the actual work situation is visually checked. Here, even in the case of the monocular HMD, it is still desirable to further reduce the time delay $\tau$ so as to remove discomfort in the visual check by the worker P1.

In this regard, it is possible to reduce the time delay $\tau$ to nearly zero by superimposing the instruction video picture on the work video picture shot with the camera 14 at the point of time t=t3 of reception of the instruction video picture. In this case, the video picture displayed on the monitor 15 substantially coincides with the actual work situation. Accordingly, it is possible to eliminate the discomfort in the visual check by the worker P1 even by using the monocular HMD. Moreover, it is also possible to employ a binocular HMD so as to improve the feeling of presence.

Figure 3:
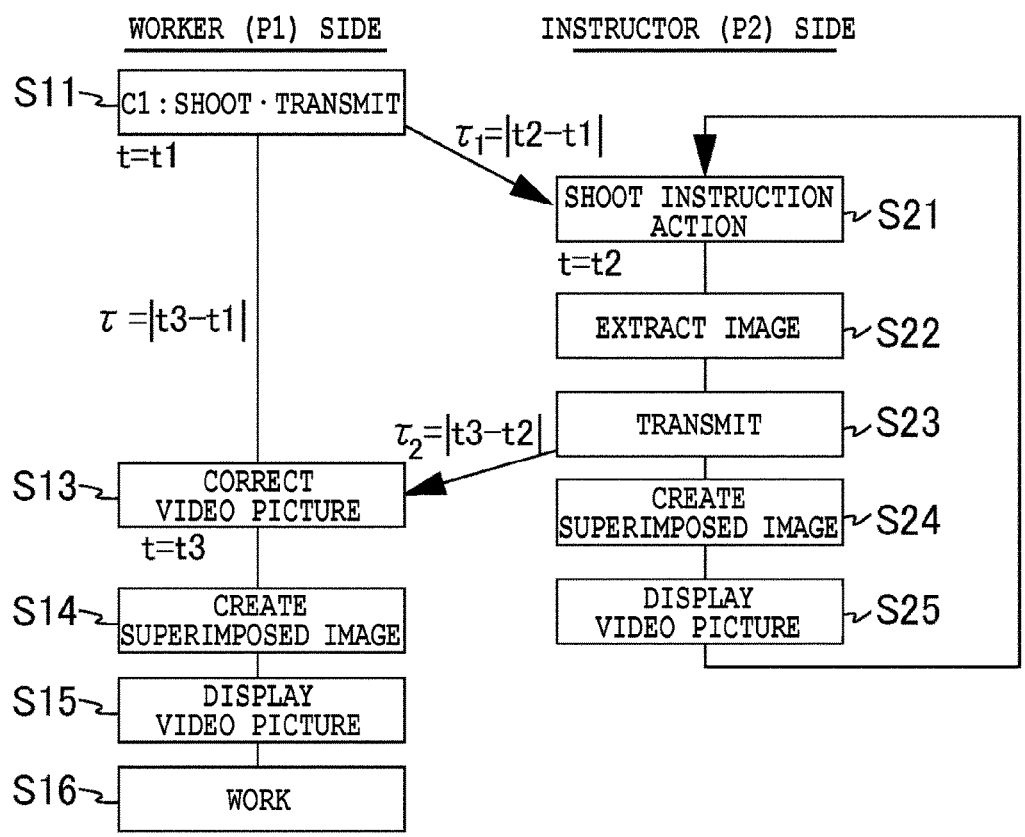
FIG. 3 is a flowchart showing a processing method according to the present invention.
Figure 4:
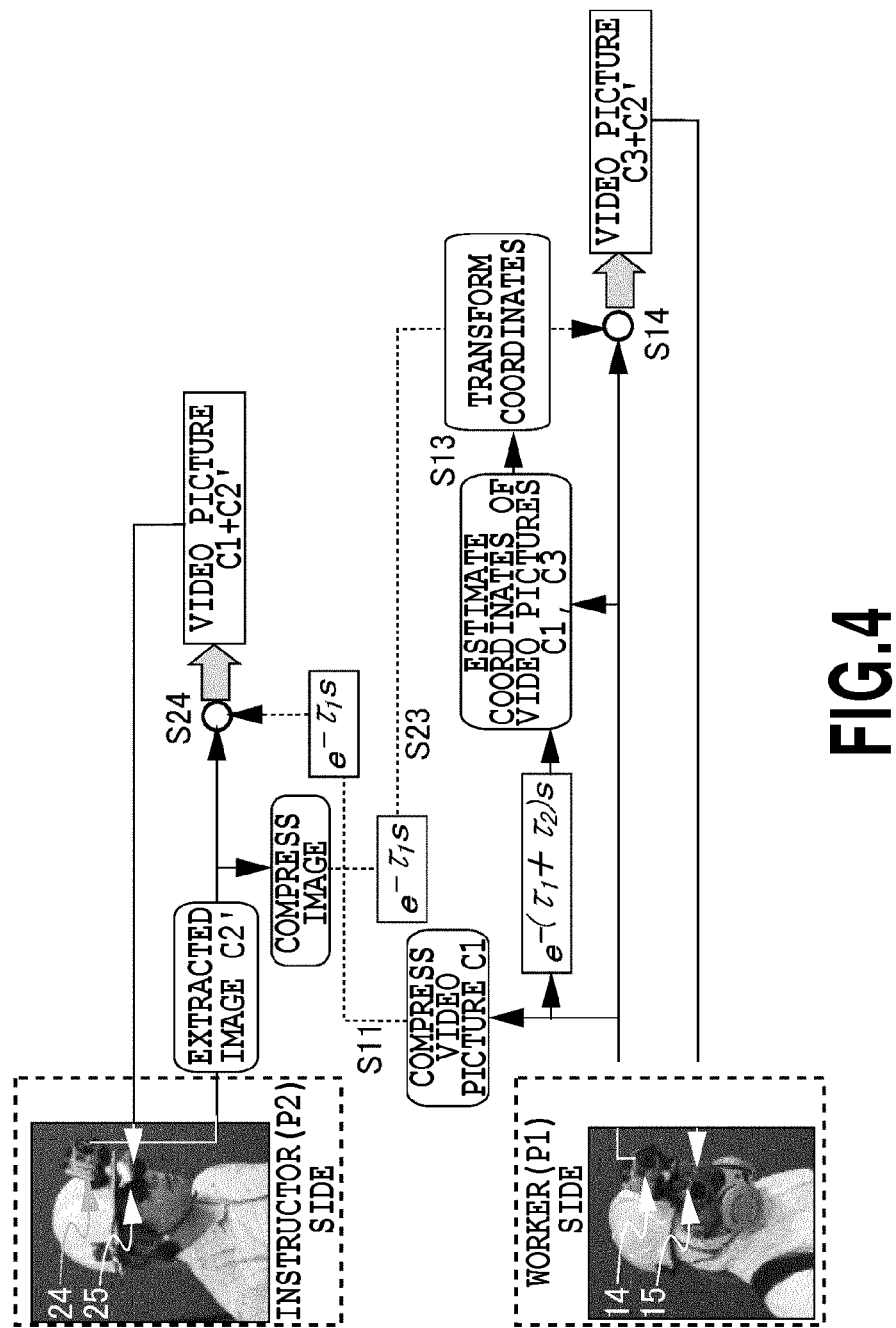
FIG. 4 is a block diagram showing the processing method according to the present invention.
Figure 5:
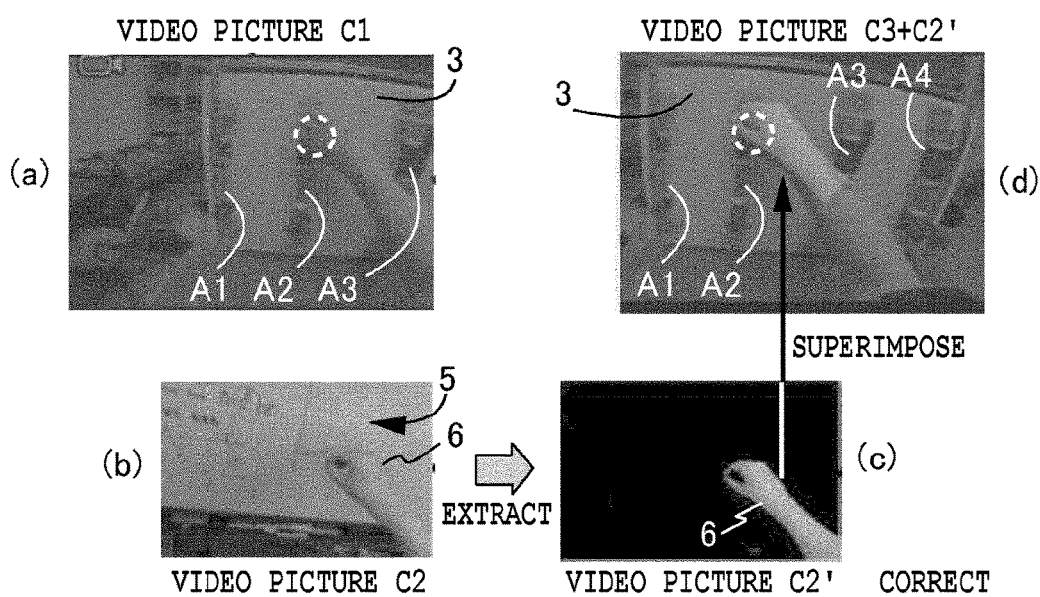
FIG. 5 includes diagrams showing the processing method according to the present invention.

Furthermore, details will be described in accordance with FIG. 3 while using FIG. 1 and FIG. 4 to FIG. 6. Here, a description will be given of a case of operating an operation tool A2 (an operation to turn a faucet) among operation tools A1, A2, A3, and so on fixed to a wall 3 as shown in FIG. 5.

First, the worker P1 at the work site shoots a video picture of the work situation in front of the worker P1 with the camera 14 at the time t=t1, then compresses video picture (image) data of this video picture C1 (see FIG. 5(a)) to reduce a transmission load on the line, and transmits the compressed data to the instructor P2 side (S11). Here, the video picture is directly displayed on the monitor 25 of the instructor P2 at a system start-up (S25).

Next, the instructor P2 chooses the operation tool A2 to be operated among the operation tools A1, A2, and so on while watching the monitor 25 of the binocular HMD displaying the video picture C1, i.e., from the same viewpoint as that of the worker P1 at the work site, and then reaches out a hand to attempt the operation. At this time t=t2, the camera 24 of the instructor P2 shoots a wrist image 6 of the instructor P2, who is attempting the operation as well as background 5 at that site together as a video picture C2 (see FIG. 5(*b*)) (S21).

The video picture C2 is subjected to image processing by the PC 21. Specifically, the background 5 is erased from the video picture C2 to obtain a video picture C2' that extracts the wrist image 6 of the instructor P2 (S22, see FIG. 5(*c*)). Here, regarding the extraction of the wrist image 6, single-color gray-scale extraction of only the contour thereof is sufficient for action guidance to be described later. This case is preferable because the amount of data transmission in the instruction transmission S102 can be reduced. This extraction can be achieved, for example, by converting the video picture C2 from RGB space into HSV space, and then filtering respective values of hue (H), saturation (S), and value (lightness) (V) into regions of specific ranges. Data of the video picture C2' is compressed and transmitted to the worker P1 side (S23).

Concurrently, the video picture C2' is superimposed on the video picture C1 (S24), and is displayed on the monitor 25 of the binocular HMD of the instructor P2 (S25). Thus, the instructor P2 can perform an instruction action while being provided with the feeling of presence as if the instructor P2 is present at the location of the worker P1.

Meanwhile, the worker P1 side having received the video picture C2' corrects the video picture by calculating time elapsed from the shooting and transmission (S11), i.e., the time delay $\tau=|t3-t1|$ from the transmission of the video picture C1 (S13). A video picture obtained by correcting the video picture C2' by means of a function of the time delay $\tau$ is superimposed on a video picture C3 with the camera 14 at t=t3 (S14).

Figure 6:
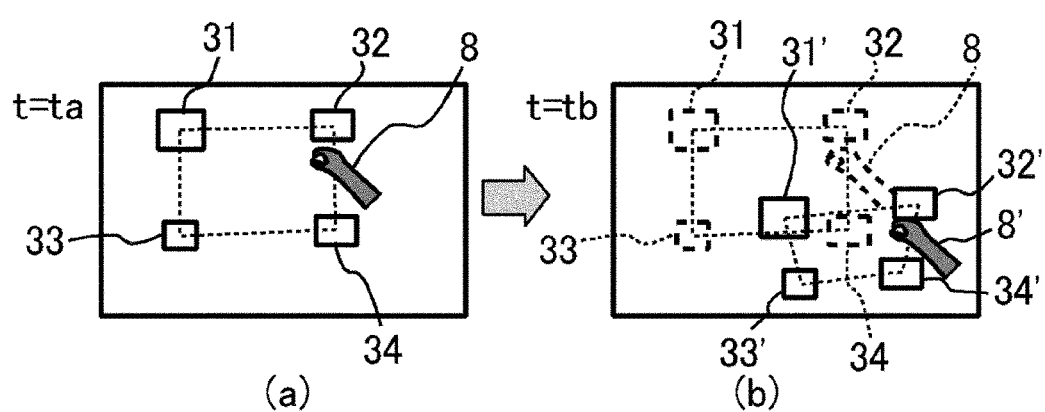
FIG. 6 includes diagrams showing the processing method according to the present invention.

Here, as shown in FIG. 6, the correction of the video picture C2' (S13) may be performed corresponding to a change in the video picture due to a movement of the camera 14, and may employ homographic transformation performed on the basis of movements of feature points 31, 32, 33, 34, and so on (only four points are illustrated herein) in a video picture (a) at $t=t_a$ and a video picture (b) at $t=t_b$ (where $t_a<t_b$). The feature points 31, 32, 33, 34, and so on are FAST, SIFT, SURF, ORB, and the like which are present on a stationary object, for example. Here, the feature points 31, 32, 33, and 34 in the video picture (a) are assumed to have moved to feature points 31', 32', 33', and 34' in the video picture (b). A homographic matrix (a plane projective transformation matrix) f is estimated on the basis of links of four or more feature points as mentioned above. Then, a specific image 8 in the video picture (a) is subjected to plane projective transformation into a specific image 8' by the homographic matrix f.

In short, it is possible to achieve the superimposition on the video picture C3 of the camera 14 at the time t=t3 by subjecting a CG image of the wrist image 6 transmitted by the instructor P2 to the plane projective transformation based on the estimated homographic matrix f (see FIG. 5(*d*)).

The superimposed video picture is displayed on the monitor 15 (S15), so that the worker P1 can work in accordance with the movement of the wrist image 6 of the instructor P2 (S16).

The remote behavior navigation system and the processing method thereof, configured to extract the CG image of the wrist image 6 transmitted by the instructor P2, then to perform the plane projective transformation based on the estimated homographic matrix, and to present this outcome to the worker P1 have been described above. In the system and the method, a work instruction video picture is extracted and transmitted to the worker P1. Accordingly, it is possible to reduce a volume of data transmission and to reduce the time delay in the data transmission as compared to the case of superimposing the instruction video picture on the work video picture and then transmitting the superimposed video picture. Moreover, by using a time difference correction which is the function of the time delay $\tau=|t3-t1|$, it is possible to form the video picture to be visually checked by the worker P1 into the video picture that almost corresponds to the time t=t3 at that point. In other words, it is possible to suppress hindrance to workability due to the time delay, so that the worker can perform accurate work while efficiently receiving the instruction by the instructor P2.

Here, it is also possible to use a terminal in which the camera 14 (24), the monitor 15 (25), and the voice device (the microphone and the speaker) 16 (26) are integrated with each PC 11 (21). In this case, the line 2 can partially include a wireless line. Meanwhile, although the transmission of the video pictures has been mainly described above, transmission of voices together with the video pictures can be performed as well. A line capacity necessary for the transmission of the voices is significantly smaller than that for the video pictures. Accordingly, it is possible to consider a transmission method in conformity with the video picture by using publicly known methods as appropriate.

As described above, it is possible to provide the worker P1 at the work site with the appropriate work instruction for the worker P1 by displaying the transformed and corrected CG image of the hand of the instructor P2 matching the most recent situation at the site while demonstrating the most recent image of the site to the worker P1 at the work site. The transformed and corrected display can be achieved by correcting the instruction information in such a way as to correspond to the on-site image which has changed from the time of transmission of the on-site image from the worker P1 to the instructor P2 to the time of reception of the instruction information from the instructor P2. In other words, this is the change in the on-site image shot with the camera 14 of the worker P1. Accordingly, the change corresponds to the movement of the camera 14, so that the transformation method such as the homographic transformation is typically applicable.

Here, in order to provide a work instruction regarding a moving object, the moving object may be rendered translucent for the purpose of clarification, and then be displayed in such a manner as to be superimposed on the on-site image as with the above-described method, for example. Meanwhile, methods of detecting the moving object include a method of constantly performing detection processing of the moving object from the on-site image shot with the camera 14 and recording detection results together with detection times, a method of performing the detection processing of the moving object by using a different portion obtained by comparing the on-site images shot with the camera 14 at different times, and so forth.

While the embodiment according to the present invention and the modified examples based on the embodiment have been described above, it is to be understood that the present invention is not limited only to the foregoing. A person skilled in the art will be able to arrive at various alternative embodiments and modified examples without departing from the gist of the present invention or from the appended claims.

REFERENCE SIGNS LIST

1 remote behavior navigation system
2 communication line 11, 21 PC
14, 24 camera
15, 25 monitor

The invention claimed is:

1. A remote behavior navigation system configured to allow an instructor at a remote location to provide a work instruction to a worker while watching a work video picture of the worker, the system comprising:
   a first camera and a first monitor provided to the worker;
   a worker-side computer configured to control the first camera and the first monitor;
   a second camera and a second monitor provided to the instructor; and
   an instructor-side computer configured to control the second camera and the second monitor, the instructor-side computer being connected to the worker-side computer via a bidirectional communication network,
   the instructor-side computer extracts a work instruction video picture from a video picture of the second camera at time t2 corresponding to a video picture from the first camera at time t1,
   (1) the instructor-side computer superimposes the work instruction video picture at the time t2 on the video picture from the first camera at the time t1, and displays the superimposed video picture on the second monitor, and
   (2) the worker-side computer provides the work instruction video picture at the time t2 with a time difference correction being a function of $\tau=|t3-t1|$, then superimposes the corrected work instruction video picture on a video picture from the first camera at time t3, and displays the superimposed video picture on the first monitor.

2. The remote behavior navigation system according to claim 1, wherein the time difference correction is homographic transformation based on a comparison between the video pictures from the first camera at the time t1 and the time t3.

3. The remote behavior navigation system according to claim 2, wherein
   the first camera is a monocular device to cover one of the eyes of the worker, and
   the second camera is a binocular device to cover both of the eyes of the instructor.

4. The remote behavior navigation system according to claim 2, wherein each of the first camera and the second camera is a binocular device to cover both of the eyes of the worker or the instructor.

5. A processing method of remote behavior navigation allowing an instructor at a remote location to provide a work instruction to a worker while watching a work video picture of the worker, the method applicable to a system including
   a first camera and a first monitor provided to the worker,
   a worker-side computer configured to control the first camera and the first monitor,
   a second camera and a second monitor provided to the instructor, and
   an instructor-side computer configured to control the second camera and the second monitor, the instructor-side computer being connected to the worker-side computer via a bidirectional communication network,
   the method comprising:
   causing the instructor-side computer to extract a work instruction video picture from a video picture of the second camera at time t2 corresponding to a video picture from the first camera at time t1;
   (1) causing the instructor-side computer to superimpose the work instruction video picture at the time t2 on the video picture from the first camera at the time t1, and to display the superimposed video picture on the second monitor; and
   (2) causing the worker-side computer to provide the work instruction video picture at the time t2 with a time difference correction being a function of $\tau=|t3-t1|$, then to superimpose the corrected work instruction video picture on a video picture from the first camera at time t3, and to display the superimposed video picture on the first monitor.

6. The processing method of remote behavior navigation according to claim 5, wherein the time difference correction is homographic transformation based on a comparison between the video pictures from the first camera at the time t1 and the time t3.

7. The processing method of remote behavior navigation according to claim 6, wherein
   the first camera is a monocular device to cover one of the eyes of the worker, and
   the second camera is a binocular device to cover both of the eyes of the instructor.

8. The processing method of remote behavior navigation according to claim 6, wherein each of the first camera and the second camera is a binocular device to cover both of the eyes of the worker or the instructor.

* * * * *